United States Patent [19]

Salikuddin et al.

[11] Patent Number: 4,689,821
[45] Date of Patent: Aug. 25, 1987

[54] ACTIVE NOISE CONTROL SYSTEM

[75] Inventors: Mohammed Salikuddin, Marietta, Ga.; Himatlal K. Tanna, Newhall, Calif.

[73] Assignee: Lockheed Corporation, Calabasas, Calif.

[21] Appl. No.: 778,822

[22] Filed: Sep. 23, 1985

[51] Int. Cl.[4] .................... H04R 27/00; H04B 15/00
[52] U.S. Cl. .......................................... 381/71; 381/94
[58] Field of Search .............................. 381/71, 73, 94

[56] References Cited

U.S. PATENT DOCUMENTS

| | | | |
|---|---|---|---|
| 4,153,815 | 5/1979 | Chaplin | 381/71 |
| 4,417,098 | 11/1983 | Chaplin | 381/94 |
| 4,473,906 | 9/1984 | Warnaka | 381/71 |
| 4,480,333 | 10/1984 | Ross | 381/71 |
| 4,506,380 | 3/1985 | Matsui | 381/71 |
| 4,562,589 | 12/1985 | Warnaka | 381/71 |
| 4,589,133 | 5/1986 | Swinbanks | 381/71 |
| 4,589,137 | 5/1986 | Miller | 381/71 |
| 4,596,033 | 6/1986 | Swinbanks | 381/71 |
| 4,607,528 | 8/1986 | Kallergis | 381/71 |

Primary Examiner—Gene Z. Rubinson
Assistant Examiner—L. C. Schroeder
Attorney, Agent, or Firm—Eric R. Katz

[57] ABSTRACT

An active noise control system reduces cabin noise levels for a propeller or propfan aircraft due to the propeller noise signature by making the output from a secondary noise source identical in amplitude but opposite in phase to the propeller noise signature.

9 Claims, 8 Drawing Figures

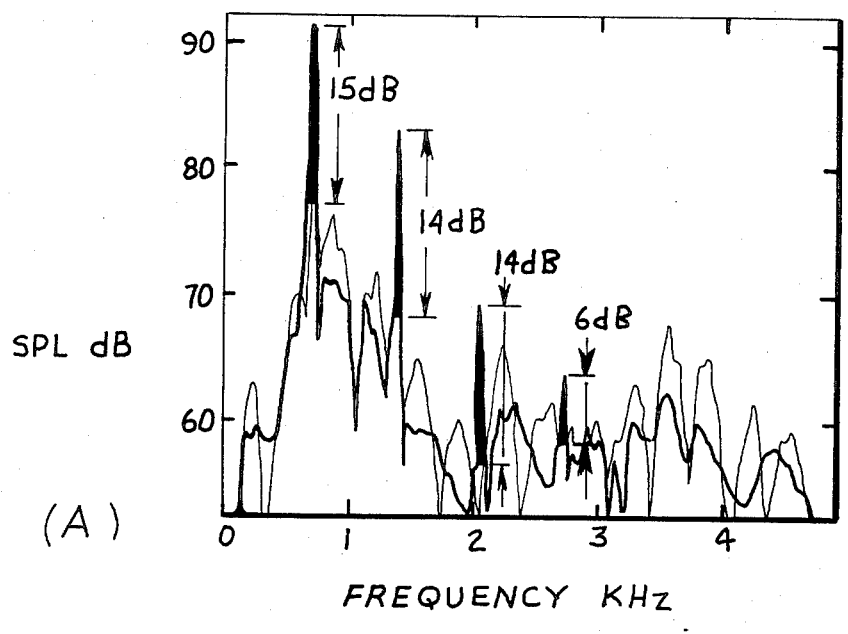
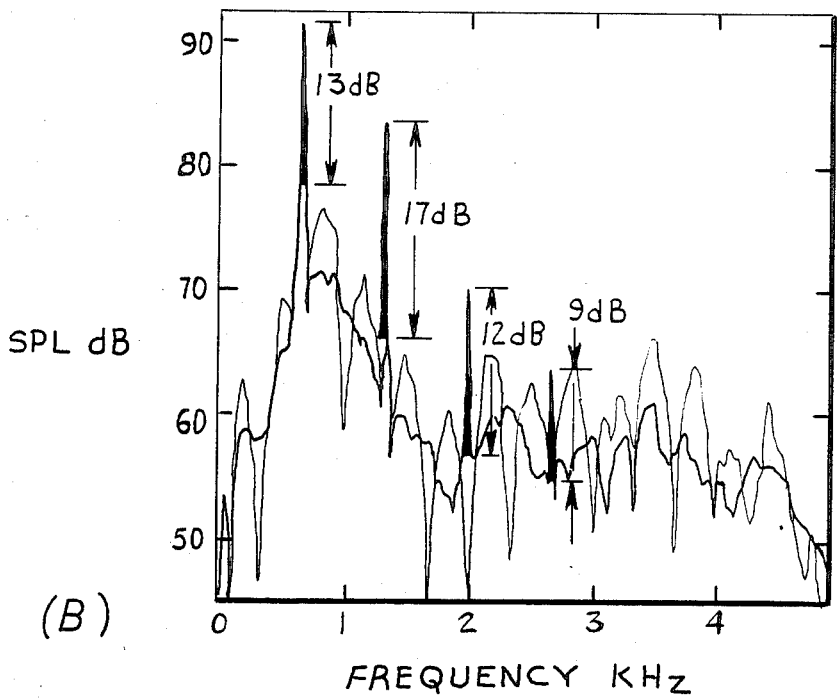
Fig. 2 —— NOISE REDUCTION

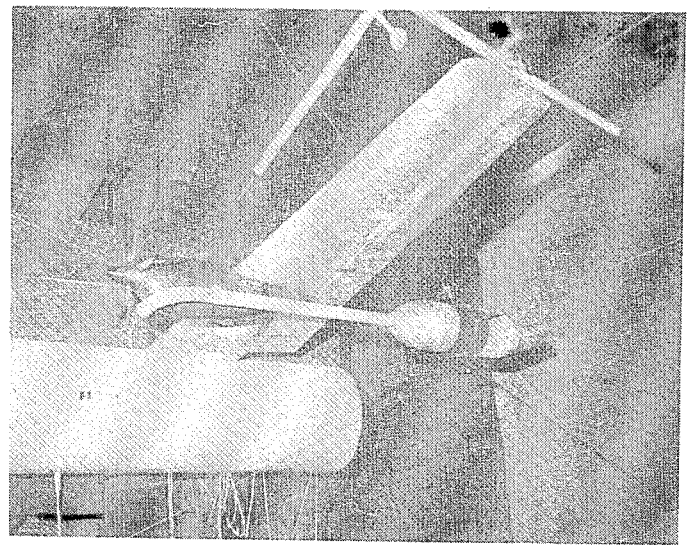
Fig_3

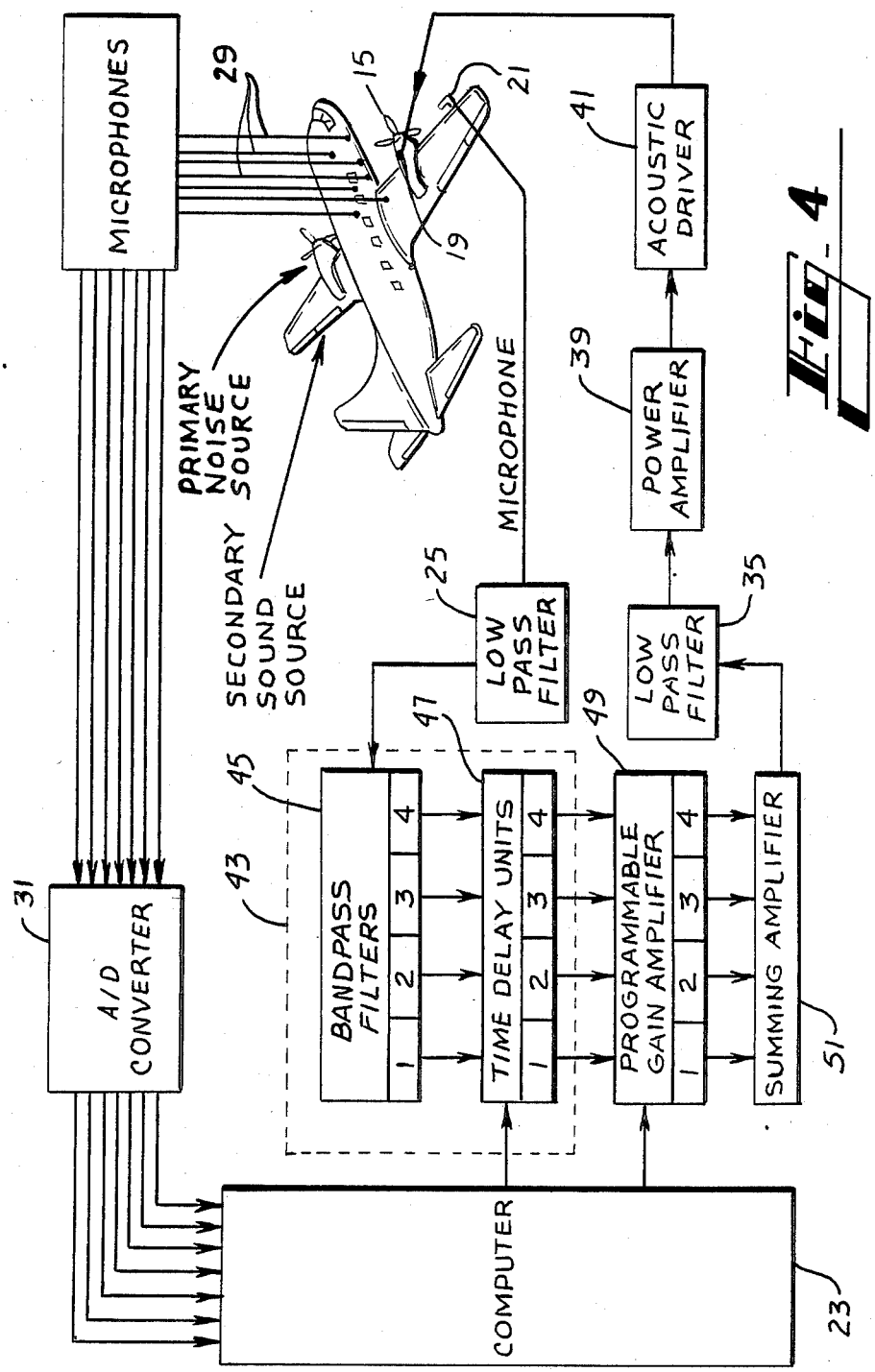

ACTIVE NOISE CONTROL SYSTEM

TECHNICAL FIELD

This invention generally relates to an active noise control system for reducing the noise radiated by a primary source utilizing a secondary sound source, and more particularly, to a system for reducing the propeller noise impinging on an aircraft fuselage surface employing active noise control externally to the aircraft.

BACKGROUND ART

It is known that high speed turboprops offer significantly higher propulsion efficiency compared with that of the high-bypass-ratio turbofan engines. However, before the potential fuel savings associated with the advanced turboprops can be realized, several important tenchological problems must be solved, one of the more serious problems being excessive aircraft cabin noise.

It is widely recognized that the cabin or interior noise of propeller-driven aircraft is significantly more annoying than the noise environment inside a jet-powered aircraft. An effective control of interior noise for large turboprop aircraft is a major obstacle in aeroacoustics, mainly because of the high level of low frequency discrete tones generated by the turboprops.

Several solutions for the control of air-borne or structure-borne interior noise of the turboprop aircraft are currently being pursued. These solutions range from the conventional approach of developing improved fuselage soundproofing methods to more sophisticated techniques such as the use of synchrophased propellers to minimize the near-field noise signature impinging on selected parts of the fuselage structure. However, each proposed solution encompasses certain definite and distinct disadvantages.

Noise reduction, utilizing the installation of soundproofing materials as part of the fuselage, has not been found to be very effective for low-frequency noise. Furthermore, passive soundproofing methods incur significant cost and weight problems, an onerous situation as applied to aircraft.

The propeller synchrophasing technique requires an accurate automatic control of the propellers so that a predetermined phase relationship between the circumferential blade locations of the propellers is maintained. Although the synchrophasing technique has been successful in reducing the annoying variations in noise level at low frequencies, its effectiveness has been limited by electronics and mechanical control problems. Further, the surface area of the fuselage that can be effectively protected is somewhat constrained.

In view of the drawbacks associated with the above-noted methods, an alternative approach, commonly referred to as active noise control, is proposed by the present inventors for reducing the interior cabin noise of a propeller/propfan aircraft. The basic principle of active noise control is to reduce the noise radiated from a primary source utilizing a secondary sound source. Since the secondary sound source signal is made identical in amplitude but opposite in phase to the primary sound source signal, a complete cancellation can be achieved within certain regions of the space surrounding the two sources.

Although known, the practical implementation of active noise control is somewhat limited. To data, the most successful utilization of this technique has been restricted to noise attenuation inside of fluid ducts. While active noise control has been applied to attenuate a near-field environment, such as a hallway or chamber, this technique has not been directed at reducing the interior cabin noise for a propeller driven aircraft as proposed by the present invention.

DISCLOSURE OF THE INVENTION

In this invention, propeller noise, the primary sound source, is measured by a microphone, the output from the microphone being inputted to an acoustic driver to provide a secondary sound source output. The input signal to the acoustic driver is modified in amplitude and phase before being fed to the acoustic driver so that the secondary source output reaching the fuselage surface meets the active noise control requirements of reducing the blade passage tone and its harmonics. This arrangement can create a feedback loop between the secondary sound source output and the microphone. As a result, the feedback loop introduces signals at undesirable frequencies which not only distort the secondary signal, but also increase the input level to the secondary sound source beyond its operational level. Additionally, the signal sensed by the microphone, which is expected to be the propeller noise, is distorted or contaminated by secondary noise. Therefore, it becomes difficult to generate a constant level output from the secondary source since the input signal, as measured by the microphone, is continuously modified by the phase-varying secondary sound source output.

These problems have been avoided by filtering of the microphone signal or by replacing the microphone signal with the output of a tachometer attached to the driving motor of the propeller. The secondary source input is generated from a computer-controlled multichannel oscillator (i.e., frequency multiplier) triggered by the tachometer signal. Significant noise reductions have been obtained at the blade passage frequency and at the first three harmonics.

Accordingly, it is an object of the present invention to provide an active noise control system for reducing the cabin noise levels externally for a propeller or propfan aircraft due to the propeller noise signature.

It is another object of the present invention to provide an active noise control system for attenuating noise due to the fundamental blade passage frequency of the propeller noise signature as well as the noise levels due to the harmonics thereof.

Still another object of the present invention is to provide an active noise control system for reducing distortion of the secondary sound source output due to contamination of the primary noise measurement by the secondary noise source output.

One important feature of the present invention is the utilization of an automatic search system which defines the average noise level at the fuselage surface as a function of the secondary source input amplitude and as a function of the phase difference between the primary noise signal and the secondary noise signal to determine the appropriate modification to the secondary noise source input to reduce noise at the fuselage surface.

Yet another important feature of the present invention is the utilization of a computer-controlled, multichannel delay unit for providing an active-control electronics system which separates and delays each tone of the propeller noise signature to permit significant noise reduction at the fundamental blade passage frequency as well as the noise levels of the harmonics thereof.

Still another important feature of the present invention is the generation of the secondary noise source input signal from a computer-controlled, multichannel oscillator coupled to a tachometer attached to the driving motor of the propeller, the tachometer output signal being equivalent to the fundamental blade passage frequency of the propeller noise signature.

In accordance with these and other objects, features and advantages of the present invention, there is provided an active noise control system for reducing the propeller noise signature impinging on an aircraft fuselage due to a revolving propeller comprising a microphone for measuring the propeller noise signature generated by the revolving propeller and for providing a microphone output signal equivalent to the propeller noise signalture, a time delay unit for receiving said microphone output signal and for delaying said microphone output signal by a predetermined time delay interval to provide a time delay output signal and a programmable gain amplifier for receiving said time delay output signal which is amplified by a predetermined gain to provide a secondary noise source input signal. A secondary noise source receives the input signal to provide an acoustic output in accordance therewith. An array of microphones for measuring the noise at a plurality of locations on the aircraft fuselage outside surface due to the propeller noise signature and the secondary noise source output and for providing an output equivalent to the measured noise at each location. A control means receives the output from the array of microphones and controls the time delay interval of the time delay unit and the gain of the programmable gain amplifier so that the microphone output signal is modified in phase and amplitude such that the secondary noise source output reaching the aircraft fuselage surface reduces the noise level of the fundamental blade frequency as well as its harmonics.

Further in accordance with the present invention the control means includes means for determining the average noise level, $(F(A,\phi))$, at the fuselage surface as a function of the secondary noise source input signal amplitude A as well as the phase difference $\phi$ between the propeller noise signature and the secondary noise source input signal; slope determining means for determining the sign of the gradient $(\partial F/\partial A)_\phi$ and $(\partial F/\partial \phi)_A$ respectively, and regulation means for varying the predetermined time delay interval of the time delay unit and the gain of the amplifier whereby $(\partial F/\partial \phi)_A$ and $(\partial F/\partial A)_\phi$ are zero.

The use of the above active noise control system yields adequate noise reduction at all harmonics when the noise signatures of the primary and secondary sources are identical in shape. However, when the primary noise source is a real propeller noise and the secondary noise is the output of an acoustic driver, driven by the propeller noise, the two noise signatures do not show much similarity. In this situation, instead of modifying the noise signature, as a whole, the individual tones are separated first and then modified individually to achieve noise reductions at all harmonics.

Still further in accordance with the present invention, to avoid problems associated with dissimilar noise signatures, the active noise and sound system further comprises a bank of band-pass filters for receiving said microphone output signal and for separating each tone of the measured propeller noise signature to provide individual output signals equivalent to each separate tone; signal modification means for varying the phase and amplitude of each tone signal to achieve the optimum noise reduction for the corresponding tone as measured at the fuselage surface by the array of microphones; and mixing means (i.e., a summing amplifier) for mixing the individual tone signal into a composite secondary noise source input signal.

To avoid the drawbacks of the use of the said microphone signal for secondary source, yet another embodiment of the present invention comprises a tachometer for providing a tachometer output signal indicative of the speed of rotation of a powerplant for driving a propeller, said output being equivalent to the fundamental blade frequency of the propeller noise signature. A multichannel oscillator, triggered by the tachometer output signal, provides a plurality of individual output signals including the fundamental blade frequency and the harmonics thereof. A time delay unit receives each individual oscillator output signal and individually delays each signal by an appropriate predetermined time interval. Thereafter, a programmable gain amplifier receives each time delay unit output signal and individually amplifies each by an appropriate gain, whereafter, a summing amplifier sums those signals into a single secondary noise source input signal. A secondary noise source, driven by the input signal, provides an acoustical signal directed towards the aircraft fuselage. An array of microphones, positioned on the surface of the fuselage, measures the resultant signal due to the secondary noise source output and the propeller noise signature. A controller receives the outputs from the array of fuselage microphones and provides appropriate signals to the time delay unit and the programmable gain amplifier to minimize the noise level due to the propeller noise signature at the fuselage surface.

BRIEF DESCRIPTION OF THE DRAWINGS

FIGS. 2A and 2B illustrate the noise reduction achieved at two microphone locations on the fuselage surface utilizing the system of FIG. 1 where the propeller noise signature is fed to an acoustic driver to generate the primary noise;

FIG. 3 illustrates the arrangement for active noise control experiments using a C-130 model propeller;

FIG. 4 is a schematic diagram illustrating an embodiment of the present invention wherein each tone of the measured propeller noise signature is separated and individually modified;

BEST MODE FOR CARRYING OUT THE INVENTION

Figure 1:
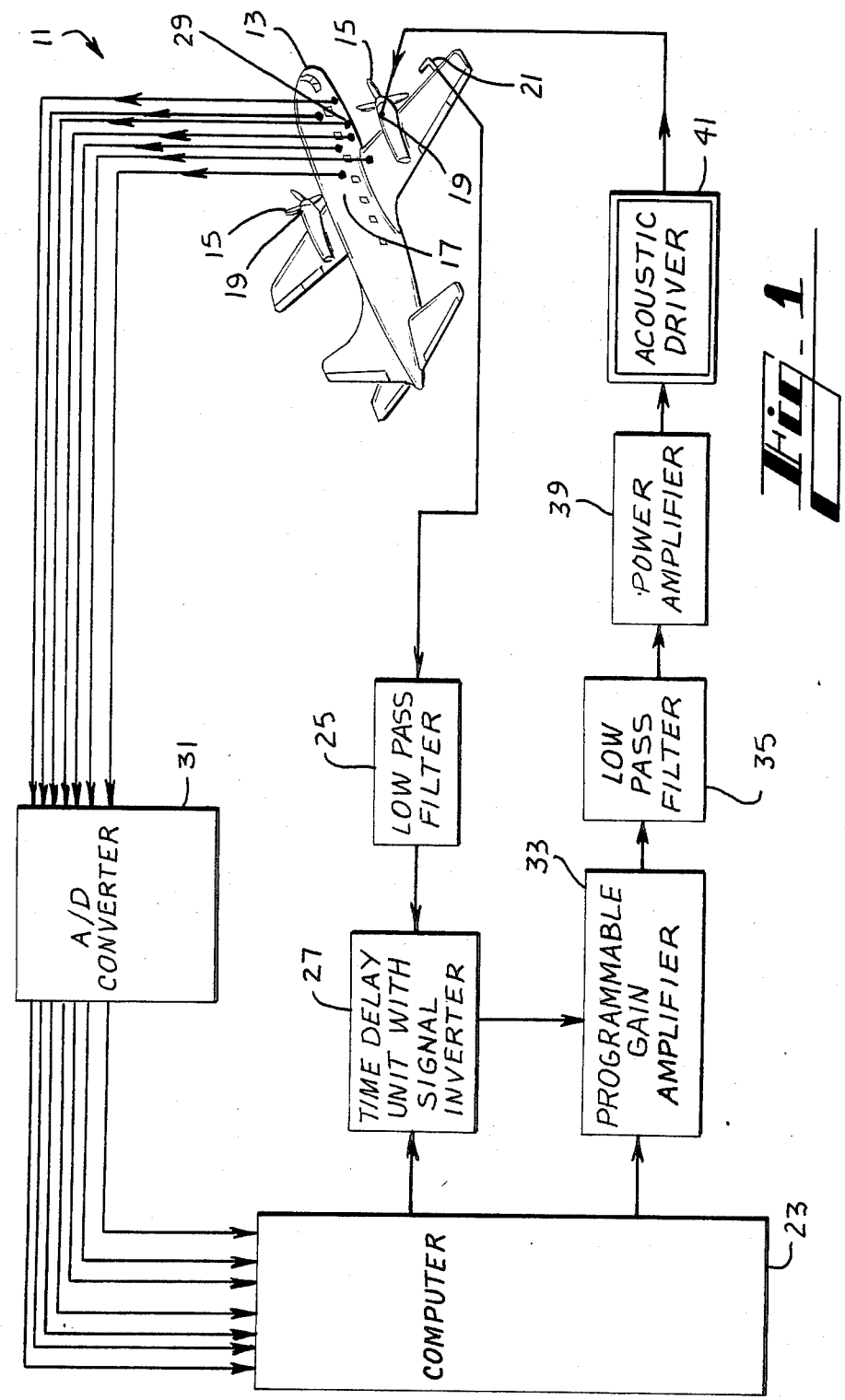
FIG. 1 is a schematic diagram illustrating the computer-controlled active noise control system with feedback loop for propeller aircraft in accordance with the present invention where the propeller noise signature, as a whole, is modified.

Referring to FIG. 1, an active noise control system of the present invention, generally indicated at 11, is illustrated as applied to a propeller driven aircraft 13. The system 11 minimizes the noise, generated by a propeller 15, at fuselage surface 17, utilizing a secondary sound source 19 positioned on each side of and facing towards fuselage surface 17. The secondary sound source 19 provides an acoustic signal which is essentially identical in amplitude, but opposite in phase to the propeller noise signature generated by propeller 15 so as to cancel or reduce the propeller noise signature at the fuselage surface 17.

According to one embodiment of the present invention, the input to the secondary sound source is derived utilizing the propeller noise signature generated by propeller 15 as measured by, for example, a microphone 21 positioned at a remote location least affected by the secondary sound-source 19. As will be described in more detail hereinafter, alternative means are employed to derive the secondary source input signal; however, the automatic search system to be described below is applied to each embodiment of the invention.

Because the noise signature impinging on fuselage surface 17 is an unsteady or quasi-steady primary noise, an automatic search system, controlled by computer 23, is employed by the present invention. In this system, a gradient technique is applied to determine the optimum value of amplitude and phase for the secondary sound source input signal. Initially, the signal from microphone 21 is passed through a low pass filter 25 to a time delay unit with signal inverter 27 where the secondary sound source input is inverted. Then, this signal is arbitrarily modified by computer 23, both in phase and amplitude, before being fed to the secondary sound source 19.

In the control process, the resultant noise signals due to propeller 15 and source 19, as measured by an array of microphones 29 positioned adjacent the surface 17, are inputted to computer 23 via analog-to-digital converters 31. The average noise level of these signals are then computed and used to determine the appropriate modification to the input signal for the secondary source 19 that would minimize the average noise level at the surface 17.

In operation the automatic search system defines the average noise level, $F(A,\phi)$, at the representative surface 17, as a function of secondary source input amplitude $A$ and the phase difference $\phi$ between the primary noise signal that is the propeller noise signature and the secondary noise signal. Hence, if a minimum of F exists, then the gradients $(\partial F/\partial A)_\phi$ and $(\partial F/\partial \phi)_A$ are zero at the optimum values of $A$ and $\phi$. To determine the optimum value of $\phi$, when $(\partial F/\partial \phi)_A$ is positive, the phase $\phi$ must be lowered and when $(\partial F/\partial \phi)_A$ is negative, phase $\phi$ must be increased until, in either instance, $(\partial F/\partial \phi)_A$ is zero. Similarly, if $(\partial F/\partial A)_\phi$ is positive, the amplitude is reduced and when $(\partial F/\partial A)_\phi$ is negative, the amplitude is increased until, in either instance, $(\partial F/\partial A)_\phi$ is zero. The programming provided computer 23 is based on the above-noted principles such that the two gradients are evaluated initially by varying $A$ and $\phi$ arbitrarily. Subsequent modifications are made based on the initial signature value of the gradients thus evaluated and the process continued until a minimum value of F is obtained.

The system of the present invention employes the delay unit 27 and a gain amplifier 33 which provides the secondary source input signal in sequence to low pass filter 37, power amplifier 39 and acoustic driven 71. The acoustic driver 41 comprises, for example, an electro-pneumatic acoustic driven such as manufactured by Ling Electronics Company. Suitable associated ductwork conducts the acoustic signal to the nacelle of the engine employed to drive propeller 15. In the automatic search system described above, amplitude multiplier 33 and delay unit 27 are both programmable and computer controlled.

Referring to FIG. 2, the noise reduction achieved to two microphone locations on the fuselage surface utilizing the system of FIG. 1 is illustrated, where the propeller noise signature is fed to an acoustic driver to generate primary noise and the same signature after proper modification fed to another acoustic driver to generate secondary noise. Referring to FIG. 3, yet another embodiment of the present invention is illustrated. This illustrates the experimental arrangement for active noise control using a model propeller 15. For the tests the acoustic driver 41 comprises a standard permanent magnetic acoustic driver.

Figure 5:
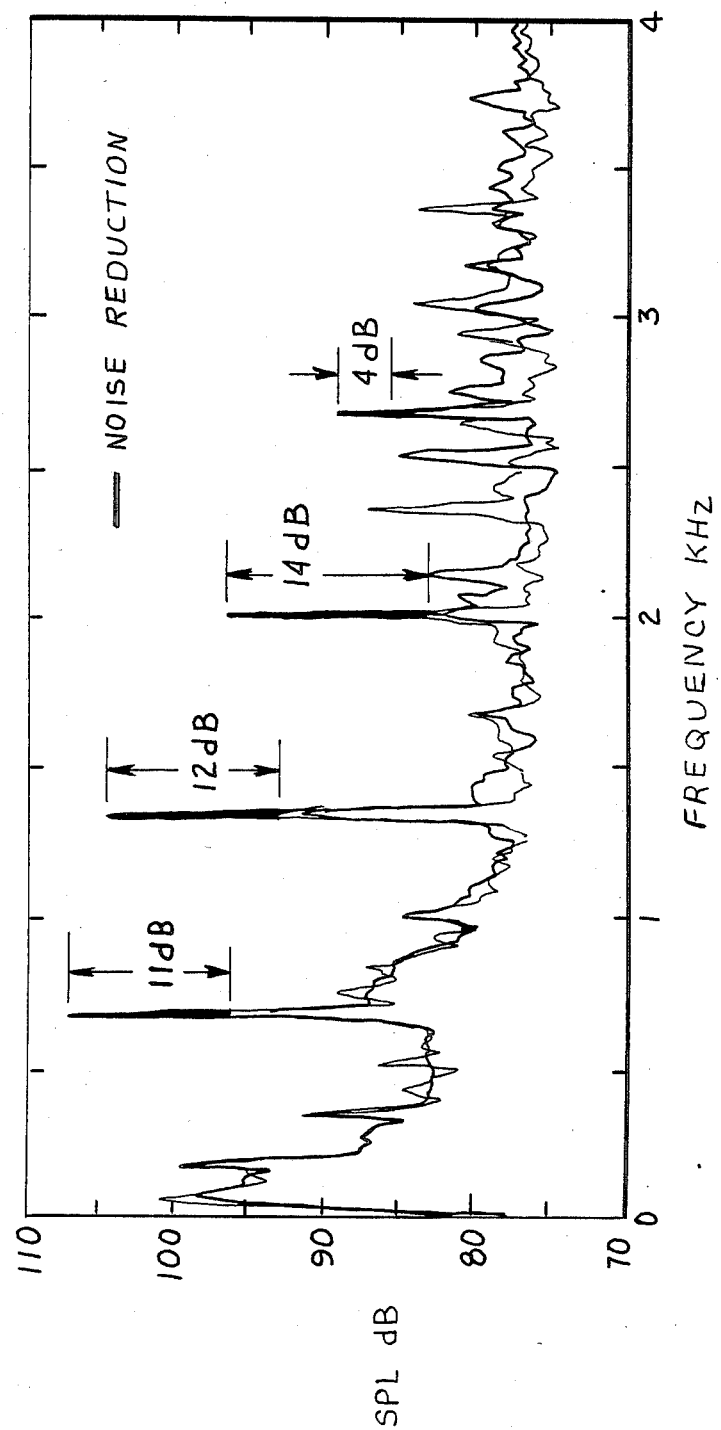
FIG. 5 illustrates the noise reduction achieved utilizing the system of FIG. 4 where the 1/10th-scale model propeller is the primary source of noise.

Referring to FIG. 4, an alternative embodiment of the active noise control system is shown employing a computer-controlled, multichannel delay unit 43. The multichannel delay unit 53 is an active-control electronics system for separating and delaying each tone of the propeller noise signature to permit significant noise reduction of the fundamental blade passage frequency as well as the noise levels for the harmonics as shown in FIG. 5, where a model propeller is used as the primary noise source.

The multichannel delay unit 43 employs a bank of band-pass filters 45 configured so as to individually pass the fundamental blade passage frequency as well as the first three (3) harmonics thereof. More than three (3) harmonics can be separated and passed by unit 43 by employing additional band-pass filters; however, for simplicity of explanation, only the first three (3) harmonics are concerned in the present discussion.

The individual tones, once separated by unit 43 into individual output signals, are modified as described with reference to the embodiment of FIG. 1, by means of a multichannel time delay unit 47 and a multichannel gain amplifier 49, under the control of computer 23. Thereafter, the individual output signals are summed by summing amplifier 51 to provide a secondary source input signal.

Figure 6:
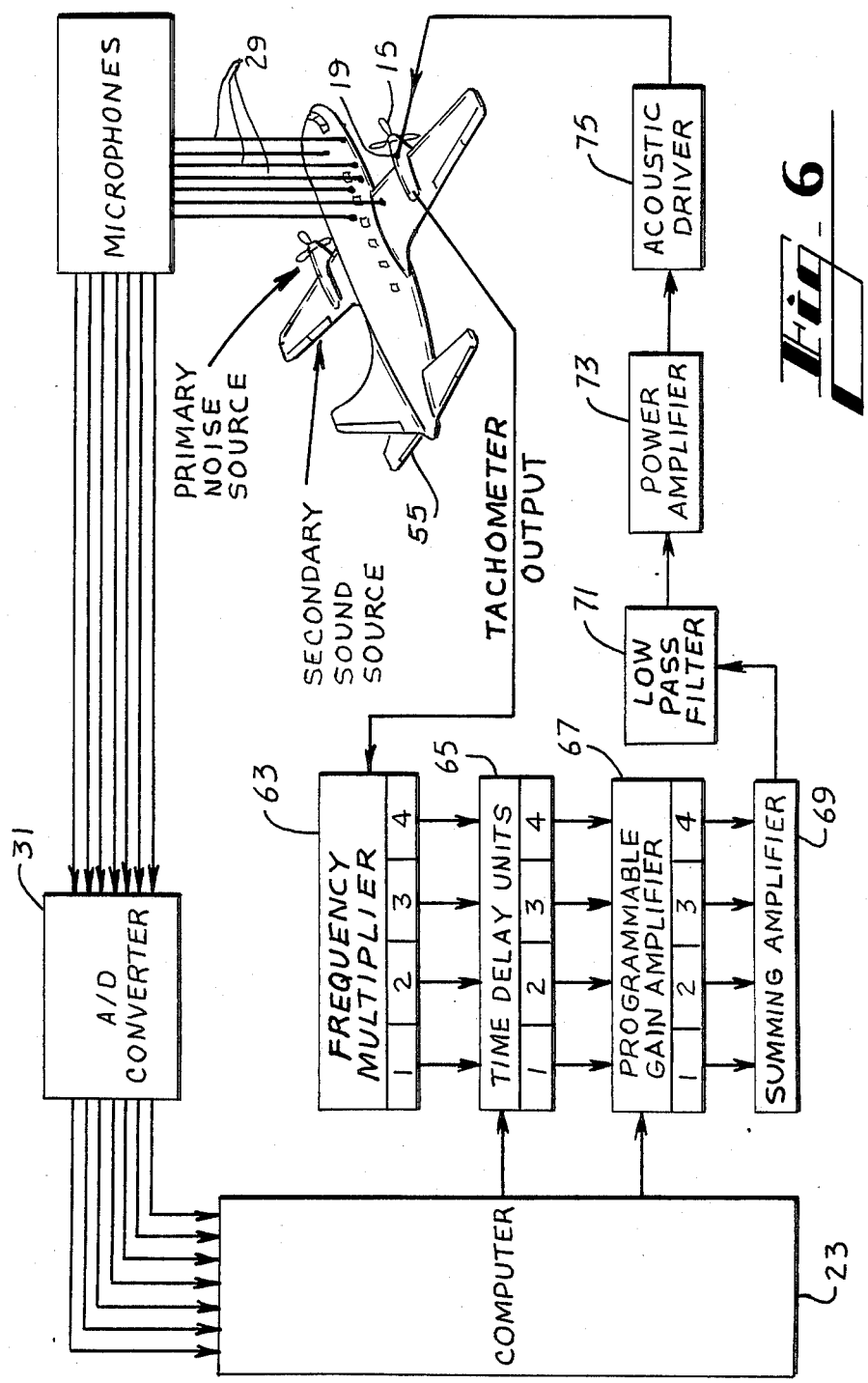
FIG. 6 is a schematic diagram illustrating yet another embodiment of the present invention wherein the secondary noise source input is defined by a tachometer output derived from the engine driving the propeller.

Referring to FIG. 6, yet another embodiment of the present invention is illustrated. The embodiment of FIG. 6 is considered preferred in that in the previous embodiments, the secondary source input signal is generated by an acoustic driver in response to the propeller noise measured by a microphone; whereas, in the present embodiment the secondary source input signal is generated by a multichannel oscillator triggered by a tachometer from the driving motor of the propeller.

The embodiments of FIGS. 1 and 4, at times, create a feedback loop between the secondary source output and the microphone. This feedback loop introduces signals at undesirable frequencies, which do not only distort the secondary signal, but also increase the input level to the secondary source beyond its limit. In addition, the signal sensed by the microphone is distorted or contaminated by secondary noise. As a result, it becomes difficult to generate a constant level output from the secondary source since the input signal, as measured by the microphone is continuously modified by the phase-varying secondary source output. To eliminate the possibility of such problems, the embodiment of FIG. 6 omits the microphone in a manner that will be more fully described hereinbelow.

Referring to FIG. 6, an active noise control system, generally indicated at 53, is illustrated for reducing the propeller noise signature impinging on aircraft fuselage 55. System 53 employs a tachometer 57 for providing a tachometer reference output signal equivalent to the speed of rotation of engine 59 for driving propeller 61, this signal being equivalent to the fundamental blade frequency of the propeller noise signature.

Figure 7:
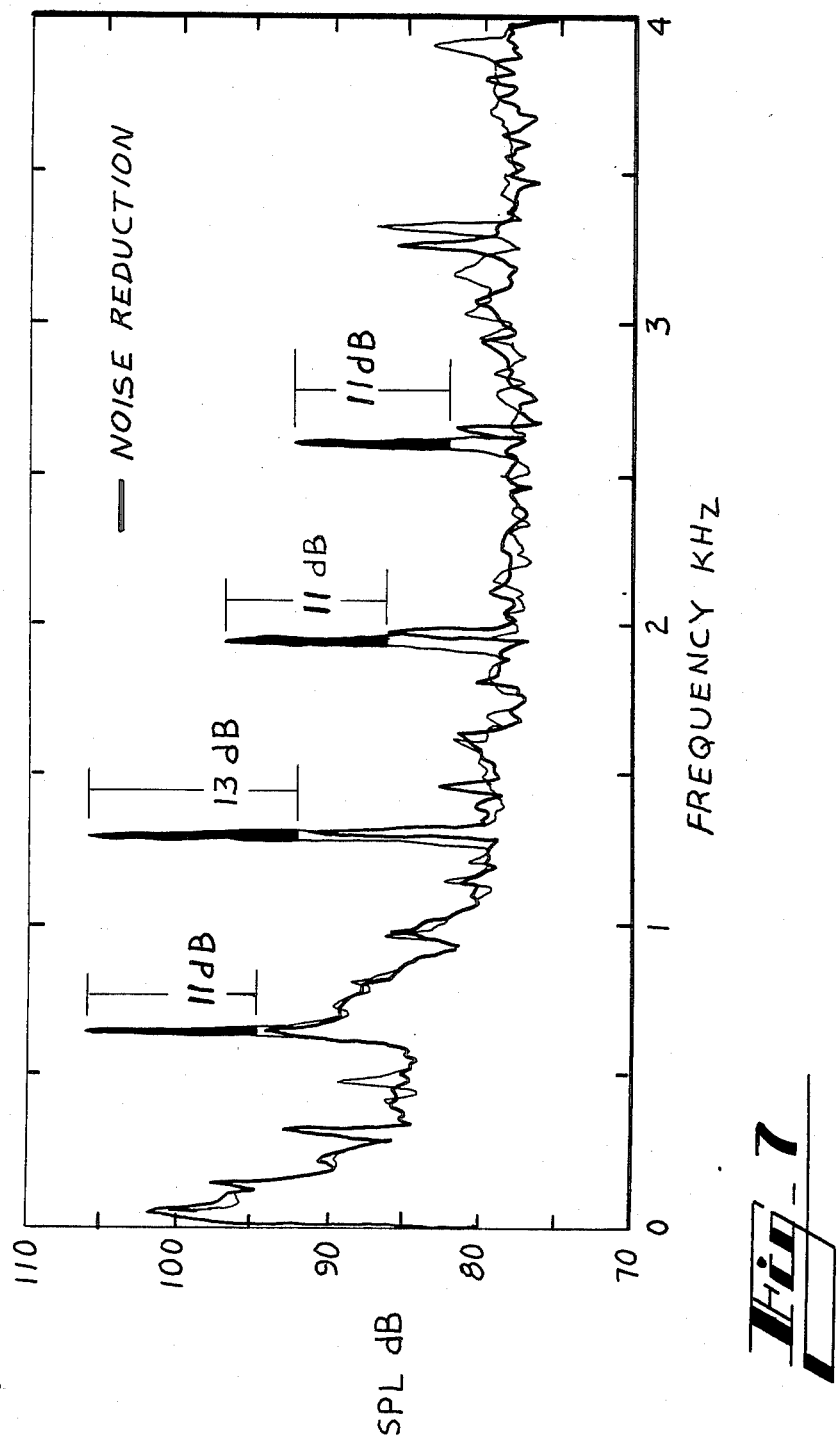
FIG. 7 illustrates the noise reduction achieved utilizing the system of FIG. 6, where the model propeller is the primary noise source.

The output of tachometer 57 triggers a multichannel oscillator or frequency multiplier 63 for providing a plurality of individual output signals including the fundamental blade frequency and harmonics thereof. A time delay unit 65 receives each individual oscillator output signal and under the control of computer 23 delays each signal individually by a predetermined time interval as described previously. A programmable gain amplifier 67 receives each individual time delay unit output signal and under the control of computer 23 amplifies each signal individually by a predetermined gain as described previously. A summing amplifier 69 receives each individual gain amplifier output signal and sums the individual signals into a single secondary sound source input signal which is passed, in series, to low pass filter 71, power amplifier 73 and acoustic driver 75. The noise reductions achieved at one microphone location on the fuselage surface using the system for the scale propeller are shown in FIG. 7.

While the invention has been particularly shown and described with reference to preferred embodiments thereof, it will be understood by those skilled in the art that various changes in form and detail may be made therein without departing from the spirit and scope of the invention as defined by the appended claims.

We claim:

1. An active noise control system for reducing the propeller noise signature impinging on an aircraft fuselage due to a revolving propeller comprising:

(a) a microphone for measuring the propeller noise signature generated by the revolving propeller and for providing a microphone output signal equivalent to the propeller noise signature;

(b) a time delay unit for receiving said microphone output signal and for delaying said microphone output signal by a predetermined time delay interval to provide a time delay output signal;

(c) a programmable gain amplifier for receiving said time delay output signal and for amplifying said time delay output signal by a predetermined gain to provide a secondary noise source input signal;

(d) a secondary noise source for receiving said secondary noise source input signal and for providing an acoustic output in accordance therewith; and (e) an array of microphones for measuring the noise at a plurality of locations on the aircraft fuselage due to the propeller noise signature and the secondary noise source output, and for providing an output equivalent to the measured noise at each location;

(f) control means for receiving said output from said array of microphones and for controlling the time delay interval of said time delay unit and the gain of said programmable gain amplifier whereby said microphone output signal is modified in phase and amplitude so that the secondary noise source output reaching the aircraft fuselage surface reduces the noise level of the fundamental blade passage tone as well as its associated harmonics.

2. An active noise control system according to claim 1, wherein the control means comprises:

(a) a noise level determining means for determining the average noise level, $F(A,\phi)$, at the fuselage surface, as measured by said array of microphones, as a function of the secondary noise source input signal amplitude A and the phase difference between the propeller noise signature signal as measured by said microphone and the secondary noise source input signal;

(b) gradient determining means for determining the sign, plus or negative, or the gradient $(\partial F/\partial A)_\phi$ and $(\partial F/\partial \phi)_A$ respectively; and (c) regulating means for varying the predetermined time delay interval of the time delay unit and the gain of said programmable gain amplifier whereby $(\partial F/\partial A)_\phi$ and $(\partial F/\partial \phi)_A$ are zero.

3. An active noise control system according to claim 2 further comprising a plurality of analog-to-digital converters for receiving the output signals of said array of microphones and inputting those digitalized signals to said control means.

4. An active noise control system for reducing the propeller noise signature impinging on an aircraft fuselage surface due to a revolving propeller comprising:

(a) a microphone for measuring the propeller noise signature generated by the revolving propeller and for providing a microphone output signal equivalent to the propeller noise signature;

(b) band pass filters for receiving said microphone output signal and for separating each tone of the measured propeller noise signature to provide individual output signals equivalent to each separated tone of the propeller noise signature;

(c) a multichannel time delay unit for receiving each individual tone signal and for delaying each tone signal by an individually selected predetermined time interval to provide a plurality of time delay unit output signals;

(d) a multichannel programmable gain amplifier for receiving each individual time delay unit output signal and for amplifying each signal by a selected gain to provide a plurality of gain amplifier output signals;

(e) a summing amplifier for receiving each individual gain amplifier output signal and for summing each individual gain amplifier output into a single secondary sound source input signal;

(f) a secondary sound source driven by said secondary sound source input signal for providing an acoustical signal directed towards the aircraft fuselage;

(g) an array of microphones positioned adjacent to selected positions on the aircraft fuselage for measuring the resultant signal due to said secondary sound source output and the propeller noise signature and for providing an output indicative thereof; and (h) control means for receiving said array of microphones output signals and for providing appropriate signals to said time delay unit and said programmable gain amplifier whereby the noise level at the fuselage surface is minimized.

5. An active noise control system according to claim 4, wherein the control means comprises:

(a) a noise level determining means for determining the average noise level, $F(A,\phi)$ at the fuselage surface, as measured by said array of microphones, as a function of the secondary noise source input signal amplitude A and the phase difference between the propeller noise signature signal as measured by said microphone and the secondary noise source input signal;

(b) gradient determining means for determining the sign, plus or negative, of the gradient $(\partial F/\partial A)_\phi$ and $(\partial F/\partial \phi)_A$ respectively; and (c) regulating means for varying the predetermined time delay interval of the time delay unit and the gain of said programmable gain amplifier whereby $(\partial F/\partial A)_\phi$ and $(\partial F/\partial \phi)_A$ are zero.

6. An active noise control system according to claim 5, further comprising a plurality of analog-to-digital converters for receiving the output signals of said array of microphones and inputting these digitalized signals to said control means.

7. An active noise control system for reducing the propeller noise signature impinging on an aircraft fuselage comprising:

(a) a tachometer for providing a reference output signal equivalent to the position and speed of rotation of a powerplant for driving a propeller;

(b) a multichannel oscillator for providing a plurality of individual output signals including the fundamental blade frequency and the harmonics thereof, said oscillator outputs being triggered once during each period of said tachometer output signal;

(c) a time delay unit for receiving each individual oscillator output signal and for delaying each individual oscillator output signal by a predetermined time interval;

(d) a programmable gain amplifier for receiving each individual time delay unit output signal and for amplifying each individual time delay unit output signal by a predetermined gain;

(e) a summing amplifier for receiving each individual gain amplifier output signal and for summing each individual gain amplifier output into a single secondary sound source input signal;

(f) a secondary sound source driven by said secondary sound source input signal for providing an acoustical signal directed towards the aircraft fuselage;

(g) an array of microphones positioned adjacent to selected positions on the aircraft fuselage for measuring the resultant signal due to said secondary sound source output and the propeller noise signature and for providing an output indicative thereof; and (h) control means for receiving said array of microphones output signals and for providing appropriate signals to said time delay unit and said programmable gain amplifier whereby the noise level at the fuselage surface is minimized.

8. An active noise control system according to claim 7 wherein the control means comprises:

(a) a noise level determining means for determining the average noise level, $F(A,\phi)$, at the fuselage surface, as measured by said array of microphones, as a function of the secondary noise source input signal amplitude A and the phase difference between the propeller noise signature signal as measured by said microphone and the secondary noise source input signal;

(b) gradient determining means for determining the sign, plus or negative, of the gradient $(\partial F/\partial A)_\phi$ and $(\partial F/\partial \phi)_A$ respectively; and (c) regulating means for varying the predetermined time delay interval of the time delay unit and the gain of said programmable gain amplifier whereby $(\partial F/\partial A)_\phi$ and $(\partial F/\partial \phi)_A$ are zero.

9. An active noise control system according to claim 8, further comprising a plurality of analog-to-digital converters for receiving the output signals of said array of microphones and inputting those digitalized signals to said control means.

* * * * *